July 9, 1957
N. C. VAN HOOSE
2,798,475
STONE CUTTING MACHINE
Filed June 18, 1956
2 Sheets-Sheet 2
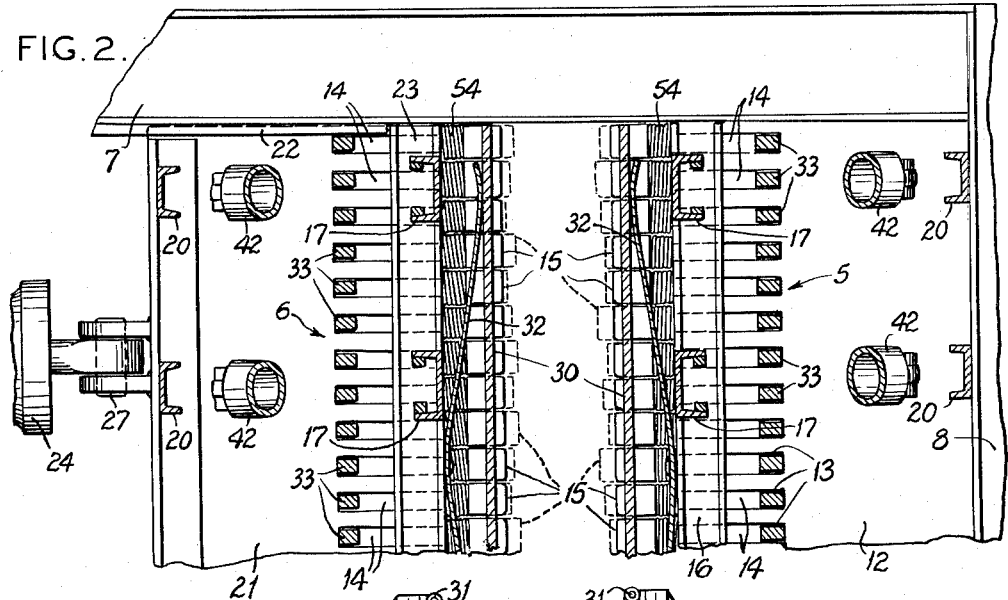
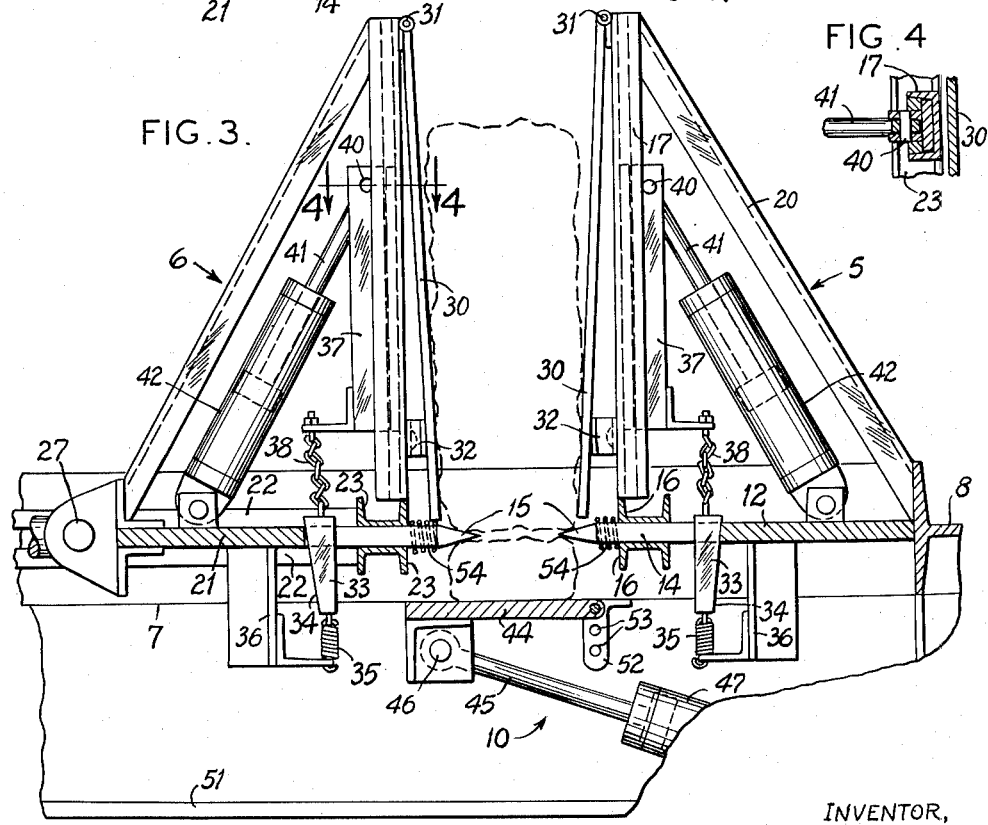
INVENTOR,
NEAL VAN HOOSE.
BY Terry and Cohn
ATTORNEYS.

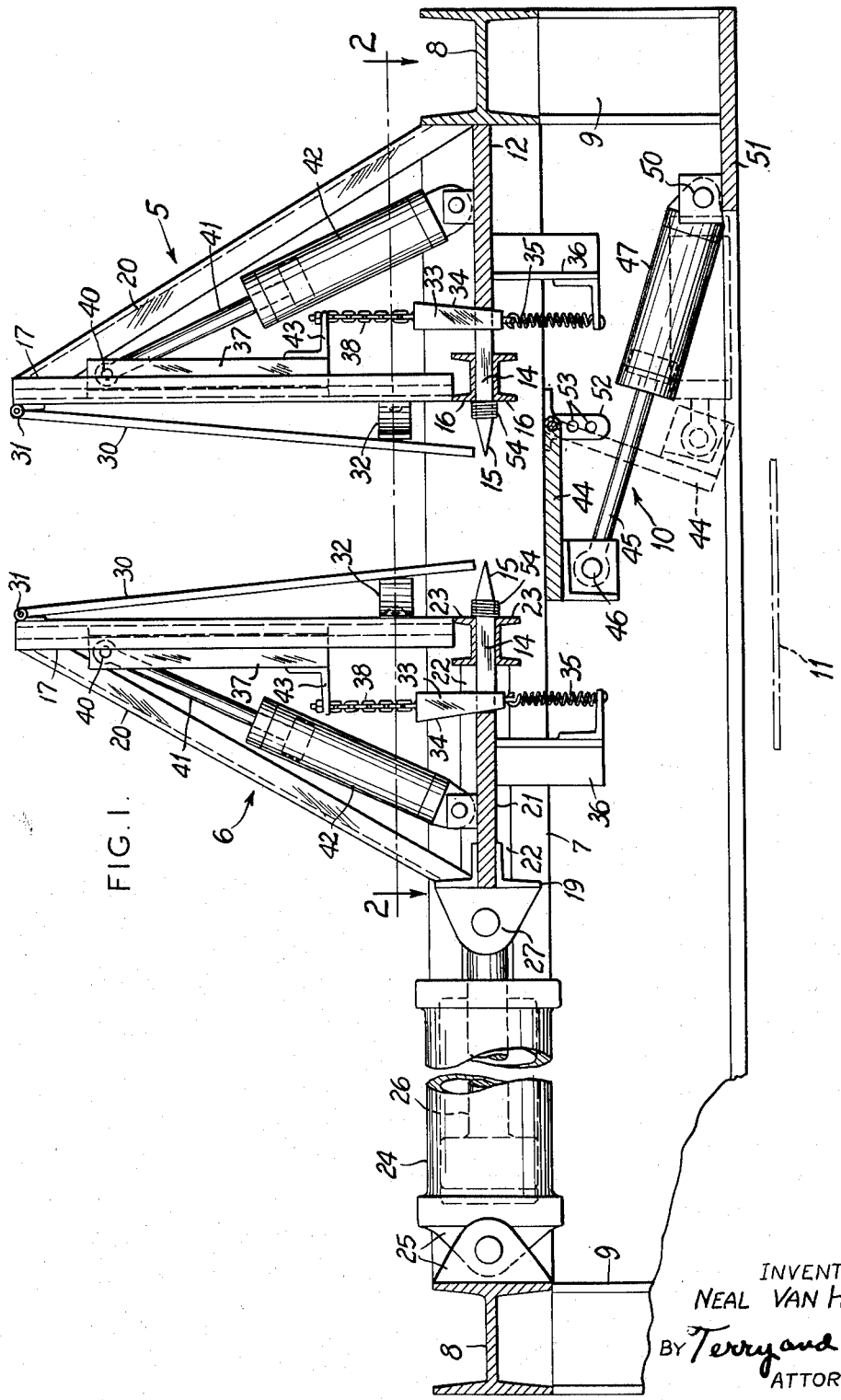

United States Patent Office 2,798,475
Patented July 9, 1957

2,798,475

STONE CUTTING MACHINE

Neal C. Van Hoose, East St. Louis, Ill., assignor to Agatan Stone and Machinery Company, East St. Louis, Ill., a corporation of Illinois Application June 18, 1956, Serial No. 592,086

14 Claims. (Cl. 125—23)

This invention relates to an improved stone cleaving machine particularly useful in the production of stone building blocks of substantially uniform thickness.

The principal object of the invention is to provide a machine that will operate quickly, efficiently and economically to cut, break or split slabs of stone into pieces of course or brick height or of other uniform sizes and shapes, thus to facilitate the production of stone blocks used for masonry buildings or for facings or ornamentations on frame or other types of construction.

The foregoing object is achieved in an improved arrangement of stone-cleaving elements on a horizontal bed frame of a machine, and in the means for feeding the uncut stone slab vertically through the cutting plane and for controlling the movement of the stone both prior and subsequent to the cutting operation.

Another important objective is realized by the provision of resilient means mounted on each of the breaker jaws of the stone-breaking machine, such resilient means being adapted to engage opposite sides of the stone slab above the plane of cut to move the stone work piece off of the stone breaking elements as the jaws are moved relatively apart, and adapted to cause the stone to fall by gravity in substantially vertical direction for a predetermined distance on to a gauge plate, thus automatically conditioning the machine for subsequent stone-cutting operation.

Still another objective is realized by the provision of improved means for adjusting the stone breaking elements to the contour of the stone slab in the plane of cut as the breaker jaws are moved relatively toward one another, and by the provision of wedging means that cooperate with the breaking elements to assure an equalization of pressure applied to the stone through the breaking elements, the structural arrangement realizing a clean, straight and uniform split.

The forgoing and numerous other objects of the invention will more clearly appear from the following detailed description of a preferred embodiment, particularly when considered in connection with the accompanying drawings, in which:

Fig. 1 is a side elevational view, partly in cross section illustrating the principal components of the machine with the cleaving jaws positioned to receive a stone slab for cutting;

Fig. 2 is a horizontal view in cross section as seen along line 2—2 of Fig. 1, showing the operating jaws and the adjustable cleaving chisels in plan;

Fig. 3 is a vertical elevational view similar to Fig. 1, but with the stone slab between the breaker jaws, and Fig. 4 is a cross sectional view as seen along line 4—4 of Fig. 3.

Referring now by characters of reference to the drawings, it will be seen that the improved stone breaking machine includes a horizontal bed frame on which is mounted a relatively fixed jaw assembly generally designated at 5, and a horizontally movable jaw assembly referred to at 6. The bed frame of the machine is a rectangular structure consisting of a pair of spaced side members, only one of which, designated 7, appears in the drawings, and opposed end members shown as heavy structural H beams 8. The end and side members 7—8 are suitably secured together at their ends as by welding to form the rectangular bed frame.

A plurality of supports 9 carry the bed frame and afford a space below such frame for a gauge plate assembly and discharging mechanism generally designated at 10, and for a receiver (not shown) for the cut stone or for a conveyor belt indicated schematically at 11 for moving the cut stone piece to a suitable receiver located at the side of the stone breaking machine.

The stationary jaw assembly 5 includes a bed anvil 12 secured to side and end members 7—8, the anvil 12 being disposed in a substantially horizontal plane. A plurality of recesses or sockets 13 best shown in Fig. 2, are provided along the inner margin of bed anvil 12, the sockets 13 being adapted to receive the shanks 14 of chisels 15 that constitute stone breaking elements. The chisels 15 extend through and betwen opposed U-shaped channels 16 that are located along the top and bottom of bed anvil 12 and are secured to and bridge side members 7. The channels 16 constitute guiding means that serve to retain chisels 15 in sockets 13, and cooperate with chisels 15 in defining a plane of cut.

The stationary jaw assembly 5 includes a plurality of upstanding vertical standards 17 supported on the uppermost guide channel 16, and includes a plurality of inclined braces 20 that are secured to the top of standard 17 and secured to side member 8, the braces 20 reenforcing the face of jaw assembly 5.

The movable jaw assembly 6 is similar in overall construction to stationary jaw assembly 5 except for the mounting structure that permits horizontal movement toward and away from stationary jaw assembly 5. This movable jaw assembly 6 includes a bed anvil 21 slidably mounted and retained in horizontally disposed guide means 22 fixed to side members 7. Similar in construction to anvil 12 of stationary jaw 5, the bed anvil 21 of movable jaw 6 is provided with corresponding recesses or sockets 13 shown in Fig. 2, adapted to receive the shanks 14 of cooperating chisels 15. In the preferred structure shown in the drawings, the bed anvils 12 and 21, and the chisels 15 carried by each, are aligned horizontally to realize a horizontal plane of cut. U-shaped channels 23 overlie and underlie sockets 13 formed in bed anvil 21, the channels 23 constituting guiding means that constrain the movement of chisels 15 horizontally in such plane of cut.

Furthermore, the movable jaw assembly 6 includes a plurality of upstanding vertical standards 17 supported by uppermost channel 23 and arranged in directly opposed relation to standards 17 of stationary jaw assembly 5. A plurality of braces 20 are secured to the uppermost ends of standards 17 in this movable jaw assembly 6, the braces 20 extending angularly between standards 17 and a cross member 19 secured to bed anvil 21.

The jaw-actuating mechanism includes a cylinder 24 pivotally connected by interfitting lugs 25 to end member 8, and includes a piston 26 received and operable in cylinder 24, the piston 26 being pivotally connected to cross member 19 by pivot structure 27. Upon introduction of fluid into cylinder 24 and at one side of piston 26, the movable jaw assembly 6 travels in a horizontal direction as determined by guiding means 22.

A cheek plate 30 is hingedly attached at 31 to the top of standards 17 in each of the jaw assemblies 5—6, the cheek plates 30 being arranged between such jaws to constitute their inner faces. In each jaw assembly, a leaf spring 32 is disposed operatively between the cheek plate 30 and vertical standards 17, the spring 32 providing a resilient mounting for the cheek plate 30 and tending to urge such plate 30 inwardly of the jaw assembly toward the opposed jaw assembly as is shown in Fig. 1. The cheek plates 30 are located above the plane of cut and extend inwardly of the jaws at an angle from the top of standards 17 downwardly to a point just beyond the cutting edges of chisels 15. These resiliently mounted cheek plates 30 are adapted to engage the opposite sides of a stone work piece located between the jaw assemblies 5—6, and serve to assist in maintaining the stone work piece in a substantially vertical position during cutting operation among other functional advantages which will be discussed in detail subsequently.

It will be apparent from the foregoing description that the chisels 15 extend inwardly of the jaw assemblies 5—6 and are permitted individually to move slidably in their mounting sockets 13. As the jaw assembly 6 is moved horizontally toward stationary jaw assembly 5, the chisels 15 engage opposite sides of the stone work piece and adjust individually to the contour of such stone by slidable movement in sockets 13. To assure equalization of pressure on the stone work piece through chisels 15, a wedge means is provided to fix the chisels 15 in their adjusted position before the chisels make the cut. The wedge means on each jaw assembly 5—6 is identical in construction and structural arrangement so that a detailed description of one will suffice for the other, corresponding character references used to indicate corresponding parts.

A wedge element 33 is located normally in each of sockets 13 and arranged operatively between bed anvil 21 of movable jaw 6 and the chisels 15, the wedge elements 33 having camming shoulders 34 adapted to engage the anvil when the wedge elements are lowered, whereby to move the chisels 15 outwardly of the anvil and inwardly between the jaw assemblies. The lower ends of wedge elements 33 are connected to one end of tension springs 35, while the opposite ends of springs 35 are secured to a fixed bracket structure 36 carried by bed anvil 21. The upper ends of wedge elements 33 are connected to a slidable bracket structure 37 by chains 38. This sliding bracket 37 is carried by upstanding standards 17 that serve as guiding means to permit vertical movement of wedge elements 33 into and out of sockets 13.

Pivotally connected at 40 to the upper end of sliding bracket 37 is a piston 41 disposed and operable in a cylinder 42, the cylinder 42 being pivotally connected to and carried by bed anvil 21 of the jaw assembly 6. In the preferred structure there are a plurality of sliding brackets 37 operable by a plurality of fluid-operated piston-cylinder assemblies 41—42, such sliding brackets 37 being connected by a transverse member 43 that carries one end of each of chains 38.

After the chisels 15 are adjusted in sockets 13 to conform to the stone contour as described previously, the piston-cylinder assembly 41—42 is operated to lower sliding brackets 37, which in turn lowers the wedge elements 33 under spring loading into sockets 13. Obviously, these wedge elements 33 adjust individually to the space at the rear of each chisel 15, and hence assure that equal pressure is applied to each of chisels 15 when the movable jaw assembly 6 is moved toward stationary jaw assembly 5 for cutting operation.

The gauge plate and discharging mechanism 10 includes a gauge plate 44 hingedly connected to the bed frame, the plate 44 being located between the jaw assemblies 5—6 and spaced below the chisels 15 and hence below the plane of cut. The distance between the plane of cut and the gauge plate determines the thickness of the stone piece that is cleaved from the stone work piece. A piston 45 is pivotally connected to plate 44 as illustrated by hinge structure 46, the piston 45 being received and operable in a cylinder 47 that is in turn pivotally connected at 50 to a subjacent support 51. In its normal horizontal position shown in full lines in Fig. 1, the gauge plate 44 is in position to support the stone work piece located between jaw assemblies 5—6 before cutting operation, and in position to support the cut stone piece after cutting operation. After the stone is cut, the gauge plate 44 may be lowered to the retracted position shown in dotted lines in Fig. 1. In such event, the cut stone piece is dropped on conveyor 11 for deliverence to a suitable receiver at the side of the stone breaking machine.

The position of gauge plate 44 may be adjusted vertically with respect to the plane of cut so as to vary the thickness of cut of the stone piece. The structure that permits this adjustment of gauge plate 44 is schematically illustrated by opposed plates 52 in Fig. 1 having a plurality of apertures 53 adapted to relocate the pivot connection of gauge plate 44. Of course, other suitable means may be employed for this purpose.

In operation, the movable jaw assembly 6 is moved horizontally away from stationary jaw assembly 5 a distance to permit the insertion and placement of a stone slab work piece between such jaws. The normal at-rest positions of the various component parts of the stone breaking machine are shown in Fig. 1. The stone work piece is placed between the jaw assemblies 5—6 and is supported on gauge plate 44 which has been previously adjusted to determine the desired thickness of cut.

Then, the movable jaw assembly 6 is moved horizontally toward stationary jaw assembly 5 by actuation of the piston-cylinder structure 24—26. Upon closing movement of movable jaw assembly 6, the cheek plates 30 resiliently engage the opposite sides of the stone work piece and serve to maintain the work piece in a substantially vertical position. As the jaws continue to move relatively toward one another, the chisels 15 engage the work piece in the plane of cut, the chisels 15 being slidably adjustable in sockets 13 as discussed previously, to conform to the stone contour. At such time, the piston-cylinder structure 41—42 is actuated to lower sliding brackets 37 and hence lower wedge elements 33 into sockets 13. The wedge elements 33 in moving downwardly into sockets 13 under loading of springs 35 adjust individually to the spacing between the ends of chisels 15 and their respective bed anvils 12 and 21, thus assuring that equal pressure will be applied to the stone in the plane of cut through chisels 15.

As the movable jaw assembly 6 continues its movement toward stationary jaw assembly 5, the chisels 15 acting in opposition on the stone work piece in the plane of cut, cleave such work piece. The chisels 15 are then extended slightly below the stone work piece located above the plane of cut so that chisels 15 and cheek plates 30 cooperate to hold this portion of the work piece in position between the jaw assemblies 5—6 while the cut piece is removed. The chisels 15 are moved inwardly to a supporting position below the stone work piece by either of several methods, i. e., the movable jaw assembly 6 is continued in a direction toward stationary jaw 5 to permit this result; or the inertia of the chisels 15 at the instant of cut causes such result, or springs 54 may be provided on each of chisels 15 which act to extend the chisels 15 beneath the stone work piece as described.

Upon completion of the cut, the movement of jaw assembly 6 toward stationary jaw 5 is halted, and the stone work piece is retained between resilient cheek plates 20 and supported by chisels 15. At such time, the gauge plate 44 is hingedly moved to the lowered position shown in dotted lines in Fig. 1 by actuation of piston-cylinder structure 45—47. The cut stone piece is then dropped automatically on conveyor 11, or dropped into other suitable receiver means. The piston-cylinder structure 45—47 is then actuated to return the gauge plate to the horizontal position shown in full lines.

Then, the jaw assembly 6 is moved horizontally away from stationary jaw assembly 5 upon actuation of piston-cylinder structure 24—26 for a distance sufficient to permit passage of stone work piece between the jaw assemblies. During this operation, the cheek plates 30, resiliently engaging opposite sides of the stone work piece, push the work piece off of the chisels 15 of each jaw assembly, and hence cause and permit the stone work piece to fall by gravity in a substantially vertical direction onto gauge plate 44. When this action occurs the movement of jaw assembly 6 is halted, and the wedge elements 33 are raised by actuation of piston-cylinder structure 41—42. Thus, the parts of the stone breaking machine are returned to their initial at-rest position with the stone work piece between the jaws ready for subsequent cutting operation by the steps described.

It will have become apparent from the foregoing description that upon operation of the component parts of the stone breaking machine the stone work piece is cut by chisels 15, the cut stone piece removed, and the stone work piece automatically fed vertically by gravity onto the gauge plate for subsequent operation. Of course, suitable automatic means (not shown) may be provided for actuating the piston-cylinder structures in sequence as stated and described, or such operation may be performed by separate controls manipulated by an operator.

Although the invention has been described by making detailed reference to a single preferred embodiment, such detail is to be understood in an instructive, rather than in any restrictive sense, many variants being possible within the scope of the claims hereunto appended.

I claim as my invention:

1. A stone-breaking machine comprising a bed frame, a breaker jaw supported on said frame, a second breaker jaw reciprocally mounted on said frame to move horizontally toward and away from said first jaw, said jaws including stone-breaking means, a gauge plate located between said jaws and below said stone-breaking means, said plate supporting the stone work piece and determining the thickness of cut, and means on said jaws engaging opposite sides of said stone to maintain the stone in a substantially vertical position during cutting operation.

2. A stone-breaking machine comprising a bed frame, a breaker jaw supported on said frame, a second breaker jaw reciprocally mounted on said frame to move horizontally toward and away from said first jaw, said jaws including stone-breaking means defining a plane of cut, a gauge plate located between said jaws and below the said stone-breaking machine, said plate supporting the stone work piece and determining the thickness of cut, means resiliently mounted on each jaw and arranged to engage opposite sides of the stone work piece above the plane of cut, said resilient means serving to push the stone off of the stone-breaking means as the jaws are moved relatively apart, and hence allowing the stone work piece to fall by gravity to said gauge plate for subsequent cutting operation.

3. A stone-breaking machine comprising a bed frame, a breaker jaw supported on said frame, a second breaker jaw reciprocally mounted on said frame to move horizontally toward and away from said first jaw, said jaws including stone-breaking means adapted to engage opposite sides of the stone work piece to define a plane of cut, a gauge plate located between said jaws and below said stone-breaking means, said plate supporting the stone and determining the thickness of cut, a cheek plate mounted resiliently on each jaw and arranged to engage yieldably one side of the stone work piece above the plane of cut, said resilient cheek plates serving to push the stone off of the stone-breaking means as the jaws are moved relatively apart after breaking operation, and the resiliently mounted cheek plates holding the stone in a substantially vertical position and causing the stone to fall by gravity substantially vertically to the gauge plate for subsequent cutting operation.

4. A stone-breaking machine comprising a bed frame, a breaker jaw supported on said frame, a second breaker jaw reciprocally mounted on said frame to move horizontally toward and away from said first jaw, said jaws including stone-breaking means extending inwardly to define a plane of cut, a gauge plate located between said jaws and below said stone-breaking means, said plate supporting the stone and determining the thickness of cut, and resilient means on said jaws adapted to engage said stone above said stone-breaking means to maintain the stone in substantially vertical position during cutting operation, the stone-breaking means moving beneath the stone after making the cut to support said stone while the cutting stone piece is removed from said gauge plate.

5. A stone-breaking machine comprising a bed frame, a breaker jaw supported on said frame, a second breaker jaw reciprocally mounted on said frame to move horizontally toward and away from said first jaw, said jaws including stone-breaking means extending inwardly to define a plane of cut, a gauge plate located between said jaws and below said stone-breaking means, said plate supporting the stone work piece and determining the thickness of cut, means resiliently mounted on each jaw and arranged to engage opposite sides of the stone work piece above the plane of cut, said stone-breaking means being movably mounted on said jaws and adapted to extend beneath the stone after making the cut so as to support the stone while the cut piece is removed from said gauge plate, said resilient means being adapted to push the stone off of the stone-breaking means as the jaws are moved relatively apart so that the stone falls by gravity to the gauge plate for subsequent operation.

6. A stone-breaking machine comprising a bed frame, a breaker jaw supported on said frame, a second breaker jaw reciprocally mounted on said frame to move horizontally toward and away from said first jaw, said jaws including stone-breaking means extending inwardly to define a plane of cut, a gauge plate located between said jaws and located below said stone-breaking means, said plate supporting the stone work piece during cutting operation, and resilient means on said jaws engaging said stone to maintain the stone in a substantially vertical position during cutting operation, the stone-breaking means moving beneath the stone after making the cut to support the stone, the gauge plate being hingedly mounted and movable to a position to drop the cut piece and movable back to a position to support the stone work piece as it falls downwardly by gravity through the jaws as the jaws are moved relatively apart.

7. A stone-breaking machine comprising a bed frame, a breaker jaw supported on said frame, a second breaker jaw reciprocally mounted on said frame to move horizontally toward and away from said first jaw, said jaws including stone-breaking means extending inwardly to define a plane of cut, a gauge plate located between said jaws and below said stone-breaking means, a cheek plate resiliently mounted on each jaw, said cheek plates being arranged to engage opposite sides of the stone work piece above the plane of cut, said cheek plates being movable under resilient loading to a position inwardly of the stone-breaking means, the stone-breaking means moving beneath the stone after making the cut to support said stone while the cut piece is removed from the said gauge plate, the resilient mounting of said cheek plates causing said cheek plates to push the stone work piece off of the stone-breaking means as the jaws are moved relatively apart so that the stone falls by gravity vertically to the gauge plate for subsequent cutting operation.

8. A stone-breaking machine comprising a bed frame, a breaker jaw supported on said frame, a second breaker jaw reciprocally mounted on said frame to move horizontally toward and away from said first jaw, each of said jaws including an anvil member, a plurality of breaking elements reciprocally mounted in each of said anvil members, said breaking elements extending inwardly between said jaws to define a plane of cut, said breaking elements being movable between said jaws to conform to the stone contour in the plane of cut as the jaws move relatively toward one another, wedging means located operatively between said anvil members and said breaking elements to assure an equalization of pressure applied to the stone through said breaking elements, and means connected to said wedging means for moving the wedging means into and out of operative engagement with said breaking elements.

9. A stone-breaking machine comprising a bed frame, a breaker jaw supported on said frame, a second breaker jaw reciprocally mounted on said frame to move horizontally toward and away from said first jaw, each of said jaws including an anvil member, a plurality of sockets provided in each of said anvil members, breaking elements slidably received in said sockets and extending inwardly between said jaws to define a plane of cut, said breaking elements being movable between said jaws to conform to the stone contour in the plane of cut as the jaws move relatively toward one another, wedge means normally located in said sockets between said breaking elements and said anvil members to assure an equalization of pressure applied to the stone through said breaking elements, and means connected to said wedge means for moving the wedge means into and out of operative engagement with said breaking elements.

10. A stone-breaking machine comprising a bed frame, a breaker jaw supported on said frame, a second breaker jaw reciprocally mounted on said frame to move horizontally toward and away from said first jaw, each of said jaws including an anvil member, a plurality of sockets provided in each of said anvil members, breaking elements slidably received in said sockets and extending inwardly between said jaws to define a plane of cut, said breaking elements being movable between said jaws to conform to the stone contour in the plane of cut as the jaws move relatively toward one another, wedge elements normally located in said sockets between said breaking elements and anvil members, resilient means connected to said wedge elements tending to move said wedge elements in wedging relation to said breaking elements to assure an equalization of pressure applied to the stone through said breaking elements, and means connected to said wedge elements for moving the wedge elements operatively out of wedging relation against loading of the resilient means as the jaws move relatively apart.

11. A stone-breaking machine comprising a bed frame, a breaker jaw supported on said frame, a second breaker jaw reciprocally mounted on said frame to move horizontally toward and away from said first jaw, each of said jaws including an anvil member, a plurality of sockets provided in each of said anvil members, breaking elements slidably received in said sockets and extending inwardly between said jaws to define a plane of cut, said breaking elements being movable between said jaws to conform to the stone contour in the plane of cut as the jaws move relative toward one another, wedge elements normally located in said sockets between said breaking elements and said anvil members, spring elements connected to said wedge elements tending to move said wedge elements in wedging relation to said breaking elements to assure an equalization of pressure applied to the stone through said breaking elements, a guide means carried by each of said jaws, a head movable in said guide means, a chain operatively connecting the head with each of said wedge elements, and means moving said head in said guide means to move said wedge elements operatively into and out of wedging relation with said breaking elements.

12. A stone-breaking machine comprising a bed frame, a breaker jaw supported on said frame, a second breaker jaw reciprocally mounted on said frame to move horizontally toward and away from said first jaw, each of said jaws including an anvil member, breaking elements slidably mounted on said anvil members, said breaking elements being slidably movable within limits between said jaws to conform to the stone contour of the plane of cut as the jaws move relatively toward one another, wedge means normally disposed operatively between said breaking elements and said anvil members to assure an equalization of pressure applied to the stone through said breaking elements, means connected to said wedging means for moving the wedging means into and out of operative engagement with said breaking elements, a gauge plate located between said jaws and below said breaking elements, said plate supporting the stone and determining the thickness of cut, and means on said jaws adapted to engage opposite sides of said stone to maintain the stone in a substantially vertical position during cutting operation.

13. A stone-breaking machine comprising a bed frame, a breaker jaw supported on said frame, a second breaker jaw reciprocally mounted on said frame to move horizontally toward and away from said first jaw, each of said jaws including an anvil member, a plurality of sockets provided in each of said anvil members, breaking elements slidably received in said sockets, and extending inwardly between said jaws to define a plane of cut, said breaking elements being movable between said jaws to conform to the stone contour in the plane of cut as the jaws move relatively toward one another, wedge means normally located in said sockets between said breaking elements and said anvil members to assure an equalization of pressure applied to the stone through said breaking elements, and means connected to said wedging means for moving the wedge means into and out of operative engagement with said breaking elements, a gauge plate located between said jaws and below said breaking elements, said plate supporting the stone and determining the thickness of cut, the breaking elements being adapted to move beneath the stone to support the stone while the cut piece is removed from said gauge plate, means resiliently mounted on each jaw, said resilient means being arranged to engage opposite sides of the stone above the plane of cut, said resilient means serving to push the stone off of the breaking elements as the jaws are moved relatively apart, and hence allows the stone to fall by gravity to the gauge plate for subsequent cutting operation.

14. The combination and arrangement of elements as recited in claim 13 above, but further characterized by the provision of spring means connected to each of said breaking elements, said spring means tending to urge said breaking elements inwardly between the jaws and toward the work piece, and hence tending to move the breaking elements beneath the stone after making the cut so as to support the stone while the cut piece is removed from said gauge plate.

References Cited in the file of this patent
UNITED STATES PATENTS

| | | |
|---|---|---|
| 1,084,827 | Sudre | Jan. 20, 1914 |
| 1,094,177 | Sudre | Apr. 21, 1914 |
| 2,552,958 | Graham et al. | May 15, 1951 |